Aug. 8, 1961
F. E. BOLLIGER
2,995,049
POWER TRANSMISSION WITH SPEED CONTROL
Filed Nov. 7, 1957
3 Sheets-Sheet 1
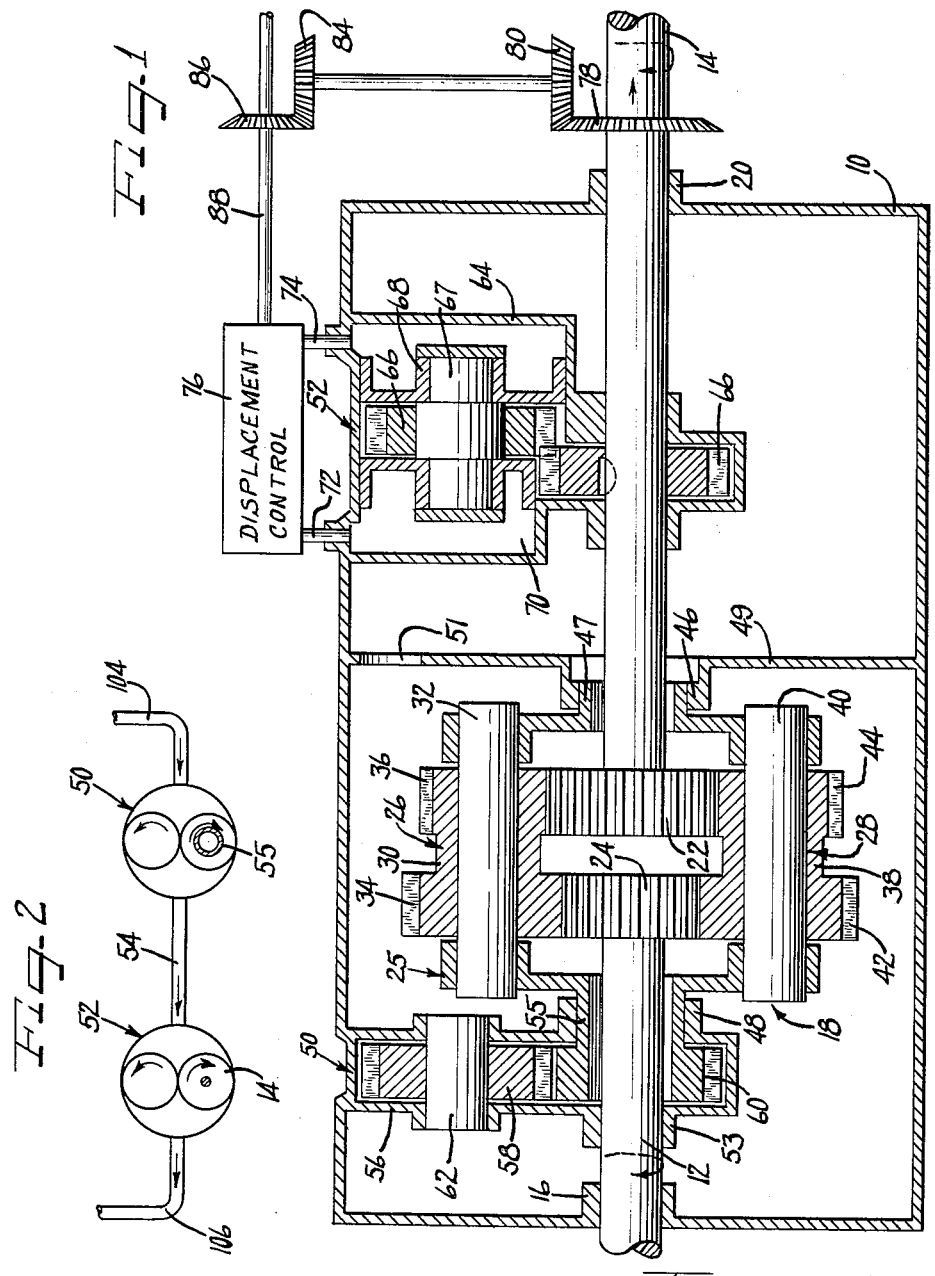
Inventor
Frederic E. Bolliger

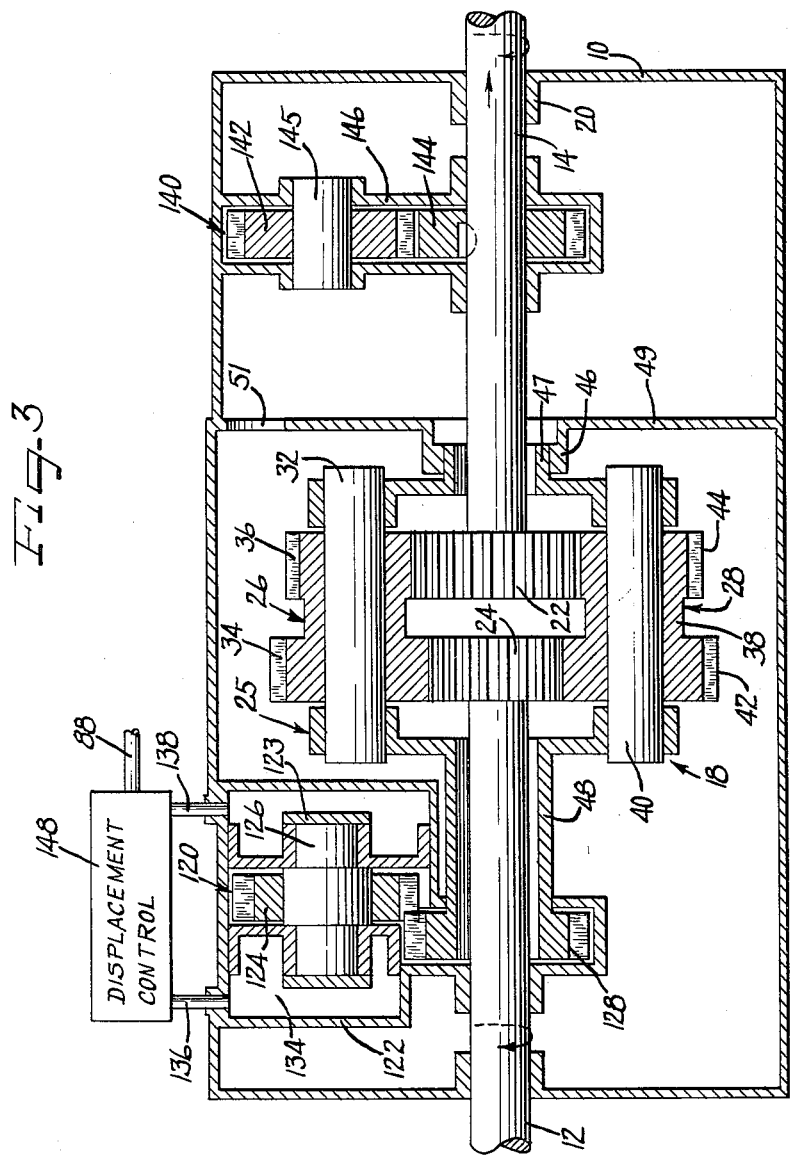

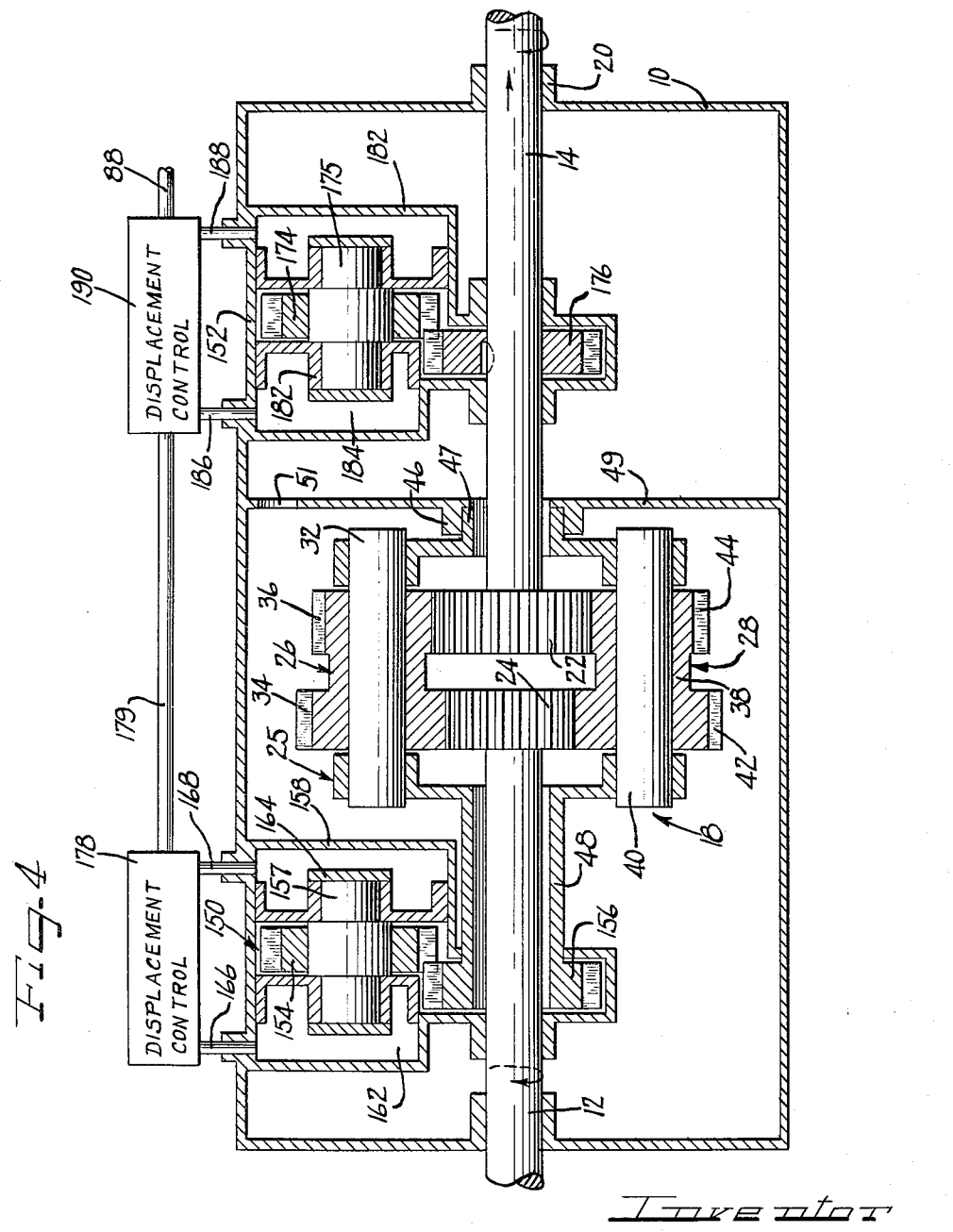

United States Patent Office 2,995,049
Patented Aug. 8, 1961

2,995,049
POWER TRANSMISSION WITH SPEED CONTROL
Frederic E. Bolliger, Bethesda, Md., assignor, by mesne assignments, to The Garrett Corporation, Los Angeles, Calif., a corporation of California
Filed Nov. 7, 1957, Ser. No. 694,992
2 Claims. (Cl. 74—687)

The present invention relates to improvements in power transmission mechanisms and more specifically to transmission mechanisms wherein the speed of the output shaft may be controlled to be different than the speed of the input shaft. The invention is particularly susceptible of use in a power transmission such as where a variable speed engine is used to drive a constant speed mechanism. An example of such a use is wherein an alternator must be driven at a constant speed for obtaining an alternating current output of a constant frequency and changes in load will cause variances in engine speed.

The invention is also susceptible of use wherein the output speed must be controlled by an external speed control signal. An example of this use is found in the driving of a fuel pump in which the delivery is varied to control the speed of the fuel consuming engine and the speed control signal is in accordance with the fuel consuming engine speed that is desired and must not be dependent on the input speed of the motor driving the pump.

In both cases given as examples above and other instances wherein either a constant speed output or a controlled speed output must be obtained, it may be important to obtain an accurate speed control and also to achieve accuracy over a wide range of speed differential between the input and output shaft. For example, in the instance of an engine driving an alternator, when the power drain on the alternator ranges from a minimum to a maximum the engine speed can also vary from idling to full power. A control which will permit this wide range of conditions is extremely useful.

In accordance with the principles of the invention, a power transmission mechanism embodying the preferred arrangement has an output shaft and has an input shaft which is adapted to be connected to an engine to drive the transmission. Between the input shaft and the output shaft is a planetary gearing with a sun gear connected to the input shaft and another sun gear to the output shaft. Power is transmitted between the sun gears by planetary gears carried on a rotatable spider.

In one form of the invention, power is fed forward between the input shaft and the output shaft through two trains, the first consisting of the planetary gearing, and the second consisting of a power conversion unit connected between the planetary gearing and the output shaft with the unit comprising a power generator and a motor driven thereby. To vary the speed of the output shaft, the power transmitted through the conversion unit is varied to thereby determine the amount of power transmitted through the planetary through from the input shaft to the output shaft. The power transmitted through the conversion unit is controlled by varying the relative speed of operation between the power generator and motor unit. This will control the speed at which the planetary gearing revolves relative to the sun gearing, which in turn controls the speed of the output shaft. The power train between the revolving planetary gears and the output shaft is illustrated in the form of a hydraulic pump unit which delivers fluid to a hydraulic motor unit, with at least one of said units having a variable displacement. In a preferred form, the pump is connected to be driven by a spider supporting revolving planetary gears, and power is fed forward from the pump to the motor which feeds power forward into the output shaft. By varying the displacement of either the pump or the motor, or both in cases where each has a construction permitting variable displacement, the speed ratio therebetween can be regulated to thereby control the speed of rotation of the spider carrying the planetary gears, and this will control the speed of the output shaft.

It is accordingly an object of the present invention to provide an improved power transmission mechanism wherein the speed of the output shaft may be controlled relative to the speed of the input shaft to obtain a controllable speed of rotation.

It is another object of the invention to provide an improved power transmission mechanism wherein the speed of the output shaft may be controlled to obtain a constant speed of rotation regardless of variances in the speed of the input shaft.

Another object of the invention is to provide an improved power transmission mechanism with speed control wherein each part of the transmission can be constructed with minimum strength so as to have minimum size and weight, and wherein each of the parts can be constructed to carry no greater load than the power that will be required to operate the mechanism to be driven.

A still further object of the invention is to provide an improved power transmission mechanism wherein the output speed may be different from the input speed and wherein power losses are greatly reduced and the transmission operates at high efficiency.

Another object of the invention is to provide an improved power transmission mechanism utilizing hydraulic fluid for controlling the output speed of the transmission and wherein the power losses are relatively small thereby avoiding the necessity of supplying heat exchange cooling devices.

A further object of the invention is to provide a power transmission mechanism capable of carrying any loads for the transmission of a substantial amount of power and which is light in weight and can be restricted to a relatively small space so as to be able to be successfully used in aircraft and other utilizations, which have minimum weight and minimum space requirements.

A further object of the invention is to provide a mechanism for controlling the output speed of an engine through a power transmission wherein the output speed can be accurately controlled at any speed over a very wide range of speeds.

A further object of the invention is to provide a power transmission mechanism of the type described wherein speed control is obtained by feeding power forward directly from the planetary gearing to the output shaft.

Other objects and advantages will become more apparent with the teaching of the principles of the present invention in connection with the disclosures of the preferred embodiments thereof, in the specification, claims and drawings, in which:

FIGURE 1 is a vertical sectional view taken through a power transmission mechanism illustrating a preferred form of the present invention;

FIGURE 2 is a schematic showing of the arrangement of a hydraulic motor and pump connected in operating relationship as used in connection with the mechanism of FIGURE 1;

FIGURE 3 is a vertical sectional view, similar to FIGURE 1, but illustrating another form of the invention; and, FIGURE 4 is a vertical sectional view similar to FIGURES 1 and 3, and illustrating still another form of the invention.

As illustrated in FIGURE 1, a power transmission mechanism is shown enclosed in a housing 10 with a power input shaft 12 projecting into the housing, and a power output shaft 14 extending from within the housing. Certain of the basic elements of the machine are common to each of the forms shown in FIGURES 1, 3 and 4, and in these figures like numerals will be used to illustrate like parts.

The power input shaft 12 is shown as being driven in a clockwise or forward direction when viewed from the input end of the shaft. The input shaft will be driven by an engine during operation and in one utilization of the invention, the engine will operate at varying speeds. In this utilization, the output shaft 14 will be driven at some desirable controlled speed, and usually a constant speed output is desired. An example of such usuage is wherein a motor is used to drive an alternator which requires rotation at a constant speed for control of electrical frequency. If such an installation is to be used in aircraft, it is important that space requirements and weight be maintained at a minimum.

The invention may also be used in circumstances wherein the input shaft is driven at a substantially constant speed, and the speed of the output shaft must be varied over a substantial range. Variance of speed of the output shaft may also be obtained where the input shaft is driven at varying speeds. An example of a use wherein the output speed can be controlled with independence of the speed of the input shaft is in driving an aircraft fuel pump wherein the input shaft is driven by the engine, and the fuel pump speed will vary with fuel control and fuel demand.

The input shaft is supported in a bearing 16 in the end of the housing and extends to connect in driving relationship to the output shaft through planetary gearing 18. The output shaft is supported in a bearing 20 in the other end of the housing.

To connect the input shaft to the planetary gearing, it carries at its end, a sun gear 24. The planetary gearing drives the output shaft through another sun gear 22 mounted at the end of the output shaft 14.

Driving rotation is transmitted from the input shaft sun gear 24 to the output shaft sun gear 22 through a first set 26 of planetary gears, and a second set 28 of planetary gears which are positioned diametrically opposite the first set. The two sets of gears are supported on a spider, referred to generally at 25.

The two sets of planetary gears 26 and 28 are identical in construction, and it will be recognized that any desirable number of planetary gears may be provided as limited only by the space requirements, and as needed in accordance with the amount of power transmited. The first planetary gearing 26 comprises a gear hub 30 which is rotatably mounted on a shaft 32 carried in the spider 25. The hub 30 has a first gear 34 which is in mesh with the sun gear 24 of the input shaft. At the other end, the hub 30 has a second gear 36 which is in mesh with the sun gear 22 of the output shaft 14. Rotational power is thus transmitted between the input and output sun gears, 24 and 22, and the speed of rotation is, of course, determined by the speed of rotation of the spider carrying the gears 26 and 28. The second planetary gear 28 is constructed similar to the gear 26 and has a hub 38 which is rotatably mounted on a shaft 40 carried by the spider 25. The hub has a first gear 42 in mesh with the input shaft sun gear 24, and a second gear 44 in mesh with the output shaft sun gear 22.

The spider 25 is formed of a unitary part which carries the planetary gears 26 and 28 together in their planetary rotation relative to the input and output shafts. The spider is journaled at one end in a support bearing 46, which rotatably supports a hollow projecting hub 47 of the spider, and which coaxially surrounds the output shaft to rotate independently thereof. The support bearing 46 is carried by partition 49 bridging across the walls of the housing 10, and provided with an opening 51 which will accommodate flow lines for hydraulic fluid in a manner which will later be discussed.

The spider 25 is supported at its other side by a bearing support which is carried as a part of a housing 56 for a pump 50, which will be described later in greater detail. The housing 56 also provides a bearing 53 which supplies additional support to the input shaft. The bearing 48 for supporting the spider receives a projecting hub 55 of the spider with the hub carrying a gear 60, which is part of the gear pump 50.

In accordance with the known relationship between a pair of shafts joined by a planetary gearing, each of the shafts and the planetary gearing will rotate at a speed which is a function of the speed of the other two members.

The following equations show the rotational relationship of the shafts and the spider, where:

$N_1$=speed of input shaft
$N_2$=speed of spider
$N_3$=speed of output shaft
$k$=constant dependent on the gear ratios of the planetary gears.

then:

(1) $\qquad N_2 = N_2(1+K) + KN_3$
(2) $\qquad KN_3 = N_1 - N_2(1+K)$
(3) $\qquad N_3 = \dfrac{N_1 - N_2(1+K)}{K}$ In the application as a variable speed drive (where input speed is essentially constant and output speed variable) there are the following combinations which are possible. The reference to "power recovery" pertains to a combination where the spider drives a power generator, such as a pump, which in turn drives a motor, such as a fluid motor, and the motor is connected to drive the output shaft. The preferred arrangement will be discussed later. The reference to "power feed in" pertains to a combination where the positions of the power generator and motor are reversed and the power generator is driven by the output shaft and the motor drives the spider.

(a) Power recovery (spider feeding power forward to output shaft)
  (1) For range of K from 1.0 to ∞, the rotation of the spider is negative. When $N_3$ increases, $N_2$ decreases. Range of $N_3$ will vary between $N_{3\ min}=0$ and $$N_{3max} = \frac{N_1}{K}$$

(2) For range of K from 0 to 1.0, the rotation of the spider is positive. When $N_3$ increases, $N_2$ decreases. Range of $N_3$ will vary between $N_{3\ min}=0$ and $$N_{3max} = \frac{N_1}{K}$$

(b) Power feed in
  (1) For range of K from 1.0 to ∞, the rotation of the spider is positive. When $N_3$ increases, $N_2$ increases. Range of $N_3$ will vary between $$N_{3min} = \frac{N_1}{K}$$

and $N_{3\ max} = \infty$.

(2) For range of K from 0 to 1.0 the rotation of the spider is negative. When $N_3$ increases, $N_2$ increases. Range of $N_3$ will be between $$N_{3min} = \frac{N_1}{K}$$

and $N_{3\ max} = \infty$.

In the application as a constant speed drive, (where output speed is essentially constant and input speed variable), there are the following combinations possible:

(a) Power recovery (spider feeding power forward to output shaft)
(1) For range of K from 1.0 to ∞, the rotation of the spider is negative. When $N_1$ increases, $N_2$ increases. Range of $N_3$ will be between $$N_{1\ min} = N_3 \times K$$

and $N_{1\ max} = \infty$.

(2) For the range of K from 0 to 1.0, the rotation of the spider is positive. When $N_1$ increases, $N_2$ increases. Range of $N_1$ will be between $$N_{1\ min} = N_3 \times K$$

and $N_{1\ max} = \infty$.

(b) Power feed in (spider being driven)
(1) For range from 1.0 to ∞, the rotation of the spider is positive. When $N_1$ increases, $N_2$ decreases. Range of $N_3$ will be between $N_{1\ min} = 0$ and $N_{1\ max} = N_3 \times K$.
(2) For range of K from 0 to 1.0, the rotation of the spider is negative. When $N_1$ increases, $N_2$ decreases. Range of $N_1$ will be between $N_{1\ min} = 0$ and $N_{1\ max} = N_3 \times K$.

Thus, in accordance with the principles of the present invention, in the preferred form, speed control is obtained by feeding a power forwardly from the planetary to the output shaft. Power is fed forwardly through the power generator and motor combination, and by a control, the speed relationship between the power generator and motor is varied to thereby vary the speed of rotation of the spider of the planetary gearing and consequently and, the speed of the output shaft, which is a function of the speed of the spider. In a preferred form of the invention, the power generator is in the form of the hydraulic gear pump 50. The motor is in the form of a hydraulic gear motor 52. As illustrated in the schematic arrangement of FIGURE 2, which shows the fluid flow relationship between the pump and motor, a fluid conduit 54 conducts the hydraulic fluid from the output of the pump 50 to the motor 52 to drive the motor.

The pump 50 is supported in the housing 56 which is supported within the main housing 10. The pump includes gears 58 and 60 with the gear 58 being supported on a shaft 62, and the gear 60 being connected directly to the hub 55 of the spider 25. Thus, the pump will be driven by the spider, inasmuch as rotation of the spider will cause rotation of the lower gear 60 of the pump to drive the upper gear 58, and fluid supplied to the intake of the pump will be forced out by the positive displacement gear pump 50.

The gear motor 52 is supported in a housing 64 which is carried within the main housing 10. The gear motor 52 includes a lower gear 66 which is keyed in positive rotational relationship with the output shaft 14. The lower gear 66 of the motor 52 meshes with an upper gear 66. Upper gear 66 is mounted for rotation on a shaft 67. The motor 52 is constructed to have a variable displacement, and for this purpose, the upper gear is shiftable axially relative to the lower gear 66. To permit this shifting, and to permit control of the axial position and the displacement of the upper gear 58, the housing 64 for the motor has a cylindrical interior 70 to form a chamber or a movable casing 68 for the upper gear. The casing is shaped to fit the cylindrical interior 70 of the housing 64, and thereby act as a piston to be moved by hydraulic control pressure. To slide the casing 68 and vary the displacement of the motor 52, a control fluid line 72 leads into one end of the chamber 70, and another control fluid line 74 leads into the other end.

The displacement of the gear motor 52 is controlled by a displacement control 76 which controls the flow of a control fluid into the chamber 70. The displacement control 76 directs fluid into one or the other end of the chamber 70 to move the gear casing 68 within the chamber 70. If the displacement of the pump is to be increased, pressurized displacement control fluid is fed into the line 72 to move the casing 68 to the right, as shown in the drawings. If the displacement of the motor 52 is to be increased, pressurized control fluid is fed to the chamber 70 through the line 74 to move the gear casing 68 to the left, as shown in the drawings. It will be understood that the motor 52, as well as the pump 50, is shown somewhat schematically, and gear motors and pumps of variable types may be used. Other types of positive displacement pumps and motors, wherein a variable displacement control is obtained may be employed.

Where a power transmission as shown in FIGURE 1, for example, is used to obtain a constant speed output from the shaft 14, a signal of the speed of the output shaft 14 is fed back to the displacement control 76. This may be accomplished by a bevel gear 78 which is secured for rotation with the output shaft and which drives a mating bevel gear 80. The bevel gear 80 is attached to a shaft 82 which carries a bevel gear 84 to drive a mating bevel gear 86. Bevel gear 86 drives a shaft 88 which is connected to the displacement control 76 to send a signal of the speed of the output shaft 14 to the control.

As will be appreciated by those skilled in the art, various known mechanisms may be employed for operating the displacement control as a function of the speed of the output shaft. For example, the shaft 88 may drive a flyball governor which in turn may be mechanically linked to a control valve that is connected to the two lines 72 and 74 so that fluid under pressure is fed to one of the lines and bled from the other line in accordance with increase or decrease in speed of the output shaft from a predetermined desired speed. Inasmuch as the details of the control are not essential, and various controls may be employed, for simplicity of disclosure the controls are not illustrated in detail.

It will be understood that other signals may be fed to the displacement control, such as a signal from the input shaft 12. Further, other control signals may be received, depending upon the circumstances in which the power transmission is used. A manual speed control signal, for example, may be fed into the displacement control, or a signal responsive to other extrinsic conditions whereby a desired output shaft speed is to be obtained. The displacement control 76 will accordingly have mechanism, such as is known to the art, for producing pressurized fluid controlled by suitable valving arrangements for feeding fluid through the lines 72 and 74 and positioning the casing 68 to thereby positively control the displacement of the motor 52.

As illustrated in FIGURE 2, the pump 50 delivers pressurized fluid to the motor 52 through the conduit 54. Hydraulic fluid is supplied to the pump through a line 104 which is connected to a suitable reservoir. After the fluid passes through the motor 52 it is discharged through a line 106 which connects back to the reservoir to form a closed system. A non-compressible fluid is used with a positive displacement pump and a positive displacement motor, so that the speed relationship between the motor and pump can be positively controlled.

In the instance where constant speed of the output shaft is desired, such as where an alternator is driven by an engine and the alternator must be rotated at a constant speed, but the load varies, the engine driving the input shaft will have a speed range from idling to full speed. At idling speeds of the engine, such as will occur when the load on the alternator drops to a minimum and the engine furnishes sufficient power to drive the alternator at idling speed, the displacement of the motor will be automatically controlled to minimum displacement. As the load on the alternator picks up and the engine driving the input shaft 12 must speed up to handle the load, the displacement of the motor will be gradually increased to be at a maximum at full speed of the engine. In this condition, a much smaller amount of the total of the power transmitted from the input shaft to the output shaft passes directly through the sun gears and the planetary gears to the output shaft and a large amount passes through the train consisting of the pump and motor assembly.

It will be understood that the arrangement of FIGURE 1 may be changed to obtain "power feed in" instead of power recovery, by providing a pump driven by the output shaft and a motor driven by the pump and connected to drive the spider. This can be done by operating the device 52 as a pump and the device 50 as a motor, by changing the fluid flow lines to an arrangement different from that of FIGURE 2. The output of 50 will be supplied to the intake of 52.

In some instances, such as for use as a constant speed drive, the latter "power feed in" may be the preferred form. In some applications of the invention, the efficiency of the system may be a prime consideration and in other the weight and space requirements. Thus, the arrangement is chosen which best meets the operating conditions.

It will also be understood that the arrangements of FIGURES 3 and 4, where the pump has a variable displacement or both the pump and motor have variable displacements, could be similarly changed to drive a pump from the output shaft and connect a pump driven motor to the spider.

In FIGURE 3, the power transmission is shown with the input shaft 12 and the output shaft 14 connected in driving relationship through a planetary gearing 18. In this embodiment, the power train between the rotating spider 25 and the output shaft 14 includes a pump 120 and a motor 140 with the pump 120 having a variable displacement and the motor 140 having a fixed displacement. The motor 140 is connected to be driven by the fluid discharged from the pump 120 through lines, which are not shown but which lead through the opening 51 in the partition 49 within the housing 10.

The pump 120 is enclosed in its housing 122, and is provided with an upper gear 124 supported on a shaft 126. The upper gear is in mesh with a lower gear 128, which is mounted on the hub 48, which projects from the spider 25 of the planetary gearing.

The housing 122 for the pump has an upper cylindrical chamber 134 for receiving displacement control fluid. The upper gear 124 of the pump is carried on a shaft 126 in a casing 123 which also is cylindrically shaped and is mounted to slide as a piston within the chamber 134. To position the casing for piston 123, a control fluid is fed into the chamber 134 at either side of the piston 123 through lines 136 or 138.

Fluid is fed to these control lines from a displacement control 138 which contains the usual mechanism for providing pressurized fluid controllable by a valve to feed into either end of the chamber 134, and relieve the opposite end. A signal indicating the speed of the output shaft 14 is fed into the displacement control through a shaft 88 in a manner similar to the embodiment of FIGURE 1.

The motor 140 is driven from the gear pump 120 and has a fixed displacement. The pump and motor are connected together in the manner illustrated in the form of FIGURE 2 with the hydraulic flow lines being similarly arranged. The motor 140 has an upper gear 142 and a lower gear 144, both of which are enclosed within the housing 146 for the motor. The upper gear is carried on a shaft 145 within the housing, and the lower gear is secured in driving relationship to the input shaft 12.

In the arrangement illustrated in FIGURE 4, the input shaft 12 and output shaft 14 with the intermediate planetary gearing 18 are of similar construction to the arrangement shown in FIGURES 2 and 3. In this instance, a pump 150 is driven from the spider 25 of the planetary gearing, and the pump drives a motor 152. Both the motor and pump have a variable displacement.

The pump 150 has an upper gear 154 and a lower gear 156. The lower gear 156 is mounted or integral with a hub 48 of the spider 25. The upper gear is carried on a shaft 157. The pump is enclosed in a housing 158 supported within the main housing 10. The housing 158 is provided with a cylindrically shaped chamber 162 in which is slidably arranged a casing 164 which encloses the upper gear 154 for axial movement relative to the lower gear 156. The casing 164 is fitted within the chamber 162 to act as a piston and its position is controlled by admitting pressurized displacement control fluid through line 166 or line 168. Fluid is supplied to these lines by displacement control 178 which again is provided with the usual mechanism for valving and supplying a pressurized fluid to position the upper gear 154 to determine the displacement of the pump 150. A speed signal is fed into displacement control 178 from a shaft 179 leading out of another displacement control 190. This displacement control receives a signal of the speed of the output shaft 14 from the shaft 88. The interconnecting shaft 179 relates the two displacement controls to each other so that they operate cooperatively to control the displacement of the pump 150 and the motor 152. As will be appreciated by those skilled in the art, the speed of the output shaft 14 may be converted by various mechanical devices to control the displacement controls 178 and 190. As previously described, a flyball governor may be employed to control valves regulating the flow between lines 186 and 188. Similarly a valve mechanism may be placed between lines 166 and 168 and the valves arranged to operate sequentially so that the pump 150 and the motor 152 are each moved through their full displacement range before the other unit is changed. With this arrangement a wide range of control can be achieved since the speed ratio between the pump and motor can be varied between extreme minimum and extreme maximum speed ratios.

The motor 152 has an upper gear 174 and a lower gear 176. The lower gear 176 is secured to the power output shaft 14 to transmit power thereto as the motor 152 is driven by the pump 150. The upper gear 174 is mounted on a shaft 175 and the gear and shaft are mounted in a casing 182. This casing is slidably supported for axial movement of the gear 174 within a cylindrical chamber 184 defined in the upper part of the motor housing 182. The casing 175 thereby acts as a piston and its position is controlled by fluid forced into either end of the chamber 184. The displacement control fluid flows through lines 186 and 188, and the fluid is regulated by the displacement control 190.

The displacement controls 170 and 190 may work together, but preferably operate in sequence. Thus a considerable range of speed control can be achieved. For example, at the beginning of the range of control, when the input engine 12 is at idling speed, the motor 152 can be set at minimum displacement and the pump 150 at maximum displacement. Thus, the pump 158 will be running at a high speed and the motor 152 will be running at the speed of the output shaft, the output shaft in this instance maintaining a constant speed. As the speed of the engine increases to increase the speed of the input shaft 12, either the displacement of the pump 150 or the motor 152 can first be varied. If the motor is first varied, it will be gradually changed until full displacement is achieved. At that point, the range of speed control can be continued by decreasing the displacement of the pump 150 until minimum displacement is obtained. It will thus be seen that an exceedingly wide range of speed control can be achieved, as well as very accurate speed control over small ranges of speed variation.

Thus, it will be seen that I have provided an improved power transmission mechanism which, in accordance with the basic principles of the invention, is adaptable to a wide range of uses and applications. The invention meets the objectives and advantages hereinbefore set forth.

Inasmuch as the power of the rotating planetary spider is utilized by the pump and motor arrangement, it is unnecessary to provide power dissipation devices, thus considerably reducing the size of equipment needed. Heat exchangers and other such arrangements are no longer necessary.

It will also be seen that the device itself can be very compactly built. This inherent compactness combined with the fact that a high efficiency of performance is achieved with the avoidance of power waste, makes it possible to construct a transmission able to be used in locations where a considerable amount of power must be transmitted and yet space is at a premium and the weight must not be excessive. Such installations may be found in aircraft wherein an electrical generator must be driven at a constant speed to supply the electrical requirements of a plane. Other uses may be found in aircraft wherein an engine must be used for driving a fuel pump, and many other applications utilizing the inherent features of the invention are in existence.

It will be observed that the speed control mechanism is located between the output shaft and the spider of the planetary gearing so that the load of operating the speed control does not fall on any of the drive gearing behind the speed control. That is, the sun gear 24 and the planetary gears 34 and 42 need be constructed no stronger than necessary to provide power for driving the mechanism driven from the output shaft 14. This is an important factor where size and weight must be considered in the utility and operation of the machine. All of the power for driving the speed control between the input to the speed control and the input shaft is carried between the output shaft itself and the spider of the planetary. Since the power is fed between the spider and the output shaft in achieving the speed control, and the power passes through parallel power trains to the output shaft, the parts need not be constructed of an additional size to achieve the speed control. That is, the gears directly operating the output shaft, the sun gear 22, and the planetary gears 36 and 44 need be constructed no heavier than is necessary to provide full load power to a mechanism driven by the output shaft.

Thus, it will be observed that a considerable saving in cost and an improved mechanism is attained with speed control being obtained without forfeiting any other inherent advantages in the mechanism.

I have, in the drawings and specification, presented a detailed disclosure of the preferred embodiments of my invention, and it is to be understood that I do not intend to limit the invention to the specific form disclosed, but intend to cover all modifications, changes and alternative constructions and methods falling within the scope of the principles taught by my invention.

I claim as my invention:

1. A mechanical drive mechanism comprising a power input shaft to be driven by a power source, a power output shaft to supply driving power transmitted thereto from said input shaft, a planetary gearing including a rotatably mounted spider, a first gear rotatably mounted on said spider, a second gear rotatably mounted on said spider and non-rotatably secured to said first gear, an input gear on said input shaft in driving mesh with said first gear, an output gear on said output shaft in mesh to be driven by said second gear, a fluid pump member connected to said spider, a fluid motor member hydraulically connected to be driven by said pump and connected to said output shaft, one of said members having a variable displacement so that speed ratio between said members can be changed by changing said variable displacement, means controlling the displacement of said one member whereby the relative speeds of the members may be controlled to control the speed of the spider and control speed of the output shaft, and means responsive to speed connected to said output shaft and connected to said displacement controlling means varying the displacement to obtain a constant speed of the output shaft.

2. A mechanical drive mechanism comprising a power input shaft to be driven by a power source, a power output shaft to supply driving power transmitted thereto from said input shaft, a planetary gearing including a rotatably mounted spider, a first gear rotatably mounted on said spider, a second gear rotatably mounted on said spider and non-rotatably secured to said first gear, an input gear on said input shaft in driving mesh with said first gear, an output gear on said output shaft in mesh to be driven by said second gear, a fluid pump member connected to said spider, a fluid motor member hydraulically connected to be driven by said pump and connected to said output shaft, said members each having a variable displacement so that the speed ratio between said members can be changed by changing said variable displacement, means for controlling the displacement of each of said members and changing the displacement of the members, and means responsive to speed connected to said output shaft and connected to said displacement controlling means so that with increase in speed of the input shaft the displacement of the pump member is decreased from maximum to minimum and the displacement of the motor member is increased from minimum to maximum and the displacements are varied to obtain a constant speed of the output shaft.

References Cited in the file of this patent

UNITED STATES PATENTS

| | | |
|---|---|---|
| 2,173,855 | Orshansky | Sept. 26, 1939 |
| 2,285,431 | Grossenbacher | June 9, 1942 |
| 2,485,126 | Wood | Oct. 18, 1949 |
| 2,517,188 | Feng | Aug. 1, 1950 |
| 2,517,876 | Howard | Aug. 8, 1950 |
| 2,573,472 | Martin | Oct. 30, 1951 |
| 2,580,946 | Orshansky et al. | Jan. 1, 1952 |
| 2,599,814 | Cull | June 10, 1952 |
| 2,750,812 | Mirone | June 19, 1956 |
| 2,890,604 | Campbell | June 16, 1959 |